June 13, 1939.  C. G. MUNTERS  2,162,271
HEATING INSULATING RECEPTACLE
Filed April 24, 1933
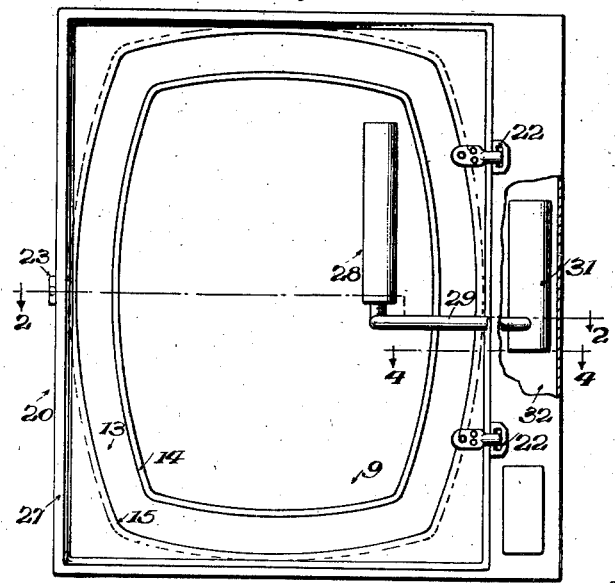
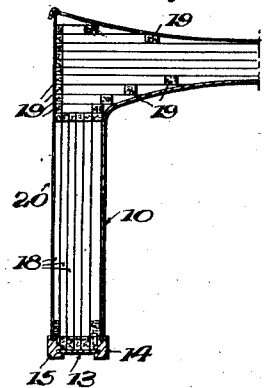
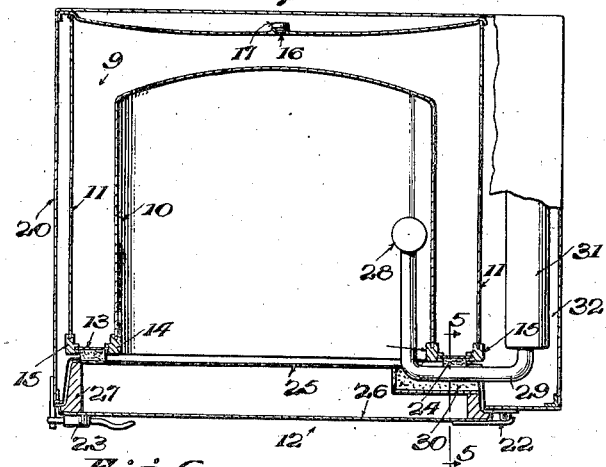
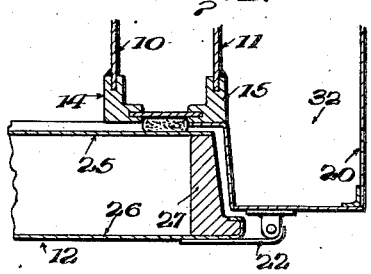
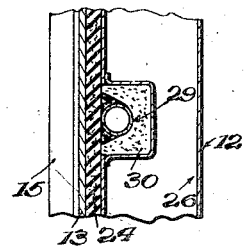
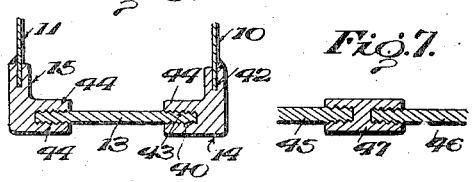
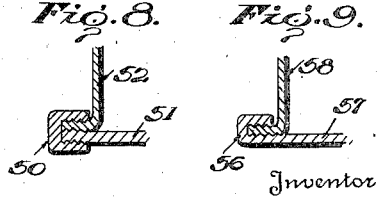
Inventor
Carl Georg Munters.
By Cameron, Kerkam & Sutton
Attorneys Patented June 13, 1939

2,162,271

UNITED STATES PATENT OFFICE 2,162,271

HEAT INSULATING RECEPTACLE

Carl Georg Munters, Stockholm, Sweden, assignor to Aktiebolaget Termisk Isolation, Stockholm, Sweden, a corporation of Sweden Application April 24, 1933, Serial No. 667,718
In Sweden April 30, 1932

10 Claims. (Cl. 220—9)

This invention relates to heat insulating receptacles, whether for heating or for cooling purposes, and is adapted to be embodied in receptacles of a wide variety of sizes and characters, such as cabinets, food containers, etc. In one phase of my invention, it relates to the joining of insulation walls applicable to a wide variety of devices including bottles, etc. In another phase the invention relates to refrigerator cabinet construction.

It is an object of this invention to provide an improved insulating receptacle which embodies means between the inner and outer walls of the insulating element, in gas-tight connection with said walls, whereby conduction of heat between said inner and outer walls is largely prevented.

Another object of this invention is to provide a heat insulating receptacle, particularly a refrigerator cabinet, provided with a lid or door and which is so constructed as to substantially prevent conduction of heat between the inner and outer walls of the heat insulating element, or said element and the lid or door, at the joint between said element and said lid or door.

Another object of this invention is to provide a heat insulating receptacle which is provided with means leading to the interior of the same for heating or cooling or controlling the temperature of the enclosed chamber and which enables the leading of said heating or cooling or temperature controlling means into the interior of the receptacle without interfering with the construction of the heat insulating walls.

Another object of this invention is to provide a heat insulating receptacle which is simple in construction, inexpensive to manufacture, and highly efficient in operation.

Other objects of this invention will appear as the description thereof proceeds.

The invention is capable of receiving a variety of mechanical expressions, some of which are shown on the accompanying drawing, but it is to be expressly understood that the drawing is for purposes of illustration only and are not to be construed as a definition of the limits of the invention, reference being had to the appended claims for that purpose.

Referring in detail to the drawing, wherein the same reference characters are employed to indicate corresponding parts on the several figures, Fig. 1 is a front view of a cabinet for heating or refrigeration purposes shown with the door removed;

Fig. 2 represents a horizontal section through the cabinet of Fig. 1 along the lines 2—2 thereof;

Fig. 3 is a fragmentary view showing insulation with foil sheets therein;

Fig. 4 is a fragmentary section along the lines 4—4 of Fig. 1 but on a larger scale;

Fig. 5 is a fragmentary section on a larger scale along the lines 5—5 of Fig. 2; and Figs. 6, 7, 8 and 9 are fragmentary views on an enlarged scale showing different embodiments of the invention as applied to the provision of gas-tight joints between wall elements.

Referring first to Figs. 1 and 2, the invention is shown as embodied in a heat insulating receptacle of a character suitable for use as a refrigerator. The heat insulating element thereof is composed of a gas containing space 9 formed by inner and outer walls 10 and 11 which may be made of any suitable material, preferably of sheet metal, said walls being illustrated as of curved configuration, but it is to be expressly understood that the invention is of equal applicability to walls composed of plane or other shaped elements. Interposed between said inner and outer walls 10 and 11 and providing the member with which the door 12 is to make sealing contact, is a connecting or spacing member 13, sometimes called a breaker strip, composed of a material having a low heat conductivity, such as Bakelite (which may be reinforced by means of cloth), or Celluloid, Cellone (cellulose acetate), or similar materials. Also a metal having low heat conductivity may be used, such as German silver or a nickel steel alloy having approximately 30—40 per cent nickel and 70—60 per cent iron respectively.

As shown more particularly in Fig. 4, said connecting or spacing member 13 is attached to the forward edges of the interior and exterior wall elements 10 and 11 by means of right-angled elements 14 and 15 which are provided with grooves to receive the edges of said member 13, and which are adapted to be subjected to a permanent deformation to the end that they will make a gas-tight or hermetic contact with said edges. Said elements 14 and 15 are preferably provided with longitudinal ridges as hereinafter explained more in detail in conjunction with the structures shown in Figs. 6 to 9 inclusive, to the end that said ridges may bite into the surfaces of the member being united and assure an interlocking contact therewith, and therefore said elements 14 and 15 are preferably made of a harder material than that of the member 13.

The space 9 which is enclosed by said inner and outer walls 10 and 11 and said frame or spacing member 13 is charged with a gas having a low heat conductivity as compared with air at a corresponding pressure, such as methyl chloride, sulphur hexafluoride, dichlorodifluoromethane or other similar compounds containing fluorine, sulphur dioxide or similar gas. This gas is preferably given a pressure which is substantially equal to atmospheric pressure. Gases having fluorine as a component are advantageous for this purpose because they are not absorbed by nor do they diffuse through the material of the member 13 especially if this member is made of cellulose acetate. Bakelite is also very durable and satisfactory for the purpose and can be used in conjunction with a variety of gases. The gas is charged into the space between said walls 10 and 11 through any suitable aperture or apertures such as indicated at 16, and said aperture is then hermetically sealed in any suitable way as by a disk or plug 17.

As shown more in detail in Fig. 3, the space between the walls 10 and 11 is also provided with interior means to reduce convection currents and radiation of heat between said walls. As illustrated, one or more sheets of metal foil 18 may divide said space into a plurality of chambers. Said foil partitions may be kept apart in any suitable way as by means of spacing elements 19 composed of felt or a similar material. As shown, the foils are arranged in a plurality of layers and spaced by felt strips which are wrapped around the walls of the wall 10. The space between the rear element of said walls 10 and 11 is also provided with foils as shown in Fig. 3, as it is preferred that foil partitions be employed throughout all portions of the space between the inner and outer walls 10 and 11. The joints between the edges of the foil partitions and the walls 10 and 11 are preferably closed so as to prevent the confined gas from circulating between the different chambers provided by said foil walls. In order to effectively avoid convective currents of the confined gas the distance between the foils is less than 5 mm. and preferably about 4 mm.

The foil walls may be arranged in position before the rear element of the outer wall 11 is soldered in place, after which the entire space between said walls 10 and 11 may be placed under a vacuum, and then gas of relatively low heat conductivity as compared with air at a corresponding pressure may be admitted through the aperture 16 until the space between the walls 10 and 11 has been completely filled, after which said space is sealed by means of the plug or plate 17 suitably secured in said aperture 16.

The heat insulating element composed of said inner and outer walls 10 and 11 may then be mounted in an external casing 20 of any suitable shape, construction and material so as to provide a conventional exterior. Said casing 20 has mounted thereon the door 12 heretofore referred to, as by hinges 22 of any suitable construction. A locking device 23 is also provided as diagrammatically indicated. A tight fit between the door 12 and the heat insulating element is preferably provided, and to this end a gasket 24 encircling the opening provided by the heat insulating element is provided either on the door or on the connecting member or breaker strip 13. Said gasket 24 may be made of any suitable material such as sponge rubber.

The door 12 may itself be made as a heat insulating unit and be composed of inner and outer walls 25 and 26 respectively providing an interior space which is charged with a gas of low heat conductivity as compared with air at a corresponding pressure, or said door may be provided with insulation of any other suitable character such as cork, paper foils, etc. The inside surface of the door, or at least that portion thereof which is opposed to the spacing member 13, is preferably made of material of low heat conductivity such as is used for the member 13. Furthermore, the door is preferably so dimensioned that it covers the entire front of the space defined by the edge of the outer wall 11, so that the inside surface of the door is opposed to said spacing member 13 substantially throughout its entire extent. In this way the amount of heat transferred between the inside and outside walls of the heat insulating receptacle as a whole is reduced to a minimum, both because of the material employed and also because of the relative thinness of the walls. It is of particular importance with refrigerators and heating cabinets made in accordance with the present invention that the heat leakage across the member uniting the inside and outside walls of the receptacle as a whole be kept at a minimum as otherwise it impairs the results obtainable by the improvements of the present invention.

As shown in Fig. 4, the door is also provided with a frame 27 of wood, Bakelite, or other suitable material to render the door sufficiently rigid and strong, but said frame 27 is located outside of the door member of poor heat conductivity, and here shown as outside of the tightening surface afforded by the gasket 24, so that no heat conduction can exist between said frame 27 and the insulating element composed of the walls 10 and 11.

It is sometimes desirable to provide the chamber of the heat insulating element with a member, here diagrammatically indicated at 28, for the purpose of heating or cooling the interior thereof, or for regulating the temperature of the interior, which apparatus or part must be connected to some part outside of the element proper, for instance by means of a tube or a conductor indicated diagrammatically at 29. To this end said door 12 is provided with a cut-out portion or recess 30 to receive the tube or conductor which is to run between the interior and the exterior of the insulating element. By this means, the passage of such tube or conductor through the walls 10 and 11 of the heat insulating element is avoided and the difficulties and complexities that would otherwise arise in the manufacture thereof are eliminated. Moreover, the passing of said tube or conductor through the recess 30 provided in the door enables the heat insulating unit itself to be standardized and rendered interchangeable for different apparatus and units. To provide a sufficiently tight joint at said cut-out portion 30 the space between the walls thereof and the adjoining tube or cable is preferably filled with suitable heat insulating material such as sponge rubber or similar material.

As here shown, the element 28 within the chamber of the heat insulating element communicates with a piece of apparatus 31 which is disposed in a chamber 32 provided by an extension of the cabinet 20 which is disposed exteriorly of the insulating element itself. As illustrated, the walls of the chamber 32 are extended forwardly beyond the front edges of the insulating element, so that the hinges 22 of the door 12 are so arranged that the door can be swung open without hindrance.

Depending upon the size of the cabinet and upon the facility of the member 13 to withstand the pressure differences between the exterior and the interior of the insulating element, one or a number of supports may be arranged between the inside and outside walls 10 and 11, especially at the rear of the element, so that these supports will take up the stresses to which the member 13 would otherwise be subjected. Such supports should also be made of a material having poor heat conductivity.

Referring now to Figs. 6 to 9 inclusive, the feature of the present invention relating to the provision of hermetic or gas-tight joints is shown somewhat diagrammatically by enlarged fragmentary detail views. As here shown the wall elements to be connected are secured together by members, preferably made of metal, which are so formed that they embrace the elements to be connected and may then be permanently deformed into gripping contact with said elements along surfaces which either by their formation or by interposed material provide a gas-tight joint. Preferably, said members are provided at their gripping surfaces with one or more ridges, grooves or the like, so as to provide irregular or serrated surfaces to the end that when said members are deformed into gripping contact with the elements embraced thereby, as by a pressing or rolling operation they bite into the opposed surfaces and interlock therewith.

Referring in detail to the drawing, Fig. 6 illustrates on an enlarged scale a section of the joints between the inner and outer walls 10 and 11 and the Bakelite or other connecting or spacing member 13 of poor heat conductivity. The members 14 and 15 heretofore referred to may be made of such materials as iron, brass or the like, and are provided with grooves 40 to receive the edge portions of the member 13. Said members 14 and 15 are also provided with grooves 42 to receive the edges of the walls 10 and 11 and in which said wall edges may be secured in any suitable way as by soldering, brazing, welding or the like. The walls of grooves 40 are preferably provided with longitudinal ridges 43 of such shape that when the lips 44 of a member 14 or 15 are compressed against the member 13 said ridges will penetrate the surface of the member 13, and each element 14 and 15 is therefore preferably made of a material which is harder and less elastic than the material of the member 13. Said lip portions 44 have a relatively low elasticity so that they will remain permanently deformed, when suitably pressed into contact with said member 13, and as member 13 is thus subjected throughout its periphery to a substantially uniform sealing pressure effected by the gripping contact therewith of the lips 44, a hermetic or gas-tight joint is assured between said members. If preferred, the type of joint just described can be also employed for retaining the wall elements 10 and 11 in their respective grooves 42.

Each element 14 and 15 is preferably made in one piece encircling the front opening of the receptacle, in which case copper foils or the like may be inserted at the place where the ends of the element meet, so that a good tight joint will result, said metal foils being inserted into the groove 42 and extending a sufficient distance on each side of the joint to assure a gas-tight connection. Said members 14 and 15 may also be so formed as to permit member 13 to be moved into position from the side rather than edgewise, after which the lips 44 may be bent down and pressed around the member 13.

By means of the present invention it is therefore possible to make a hermetically closed vessel having wall portions of such material as cannot be connected by soldering, brazing, welding, or the like. At the same time the procedure and construction are simple and inexpensive, and the joint so formed provides an entirely gas-tight connection even though there be a substantial pressure difference between the two sides of the joint, such as may occur when the vessel has been charged with gas at atmospheric pressure but variations in barometric pressure or temperature variations inside and outside of the vessel produce a substantial difference between the interior and exterior pressures.

Fig. 7 shows another form of connection in which two elements which are in substantial alinement are united. As here shown, elements 45 and 46 are connected by a member 47 having grooves equipped with tightening ridges as heretofore described, adapted to penetrate the surfaces of said elements 45 and 46 and thereby produce a permanent deformation of said elements, forming a gas-tight joint. In some cases it is desirable to provide means between the connecting member and the elements being connected to further assure that the joint is gastight. Such an arrangement is especially useful where some or all of the parts have approximately the same hardness. Should one or both of the members 45 and 46 consist of glass or other material not readily deformed, a layer of lacquer, Cellone or similar material may be disposed between the surfaces of members 45, 46 and 47 so as to effect a tight joint between said surfaces when pressed into contact, whether or not either or both of the opposed surfaces are provided with ridges or grooves. In such case, the Cellone for example can be painted on the surfaces while in a viscous or liquid condition, after which it may be left to dry for a suitable time before the pressing is done. Even though the materials being joined are of different hardnesses, it is sometimes desirable to use an interposed layer of suitable material, such as a cellulose acetate solution, in the grooves or on the surfaces to be engaged so as to further assure that all spaces between the contacting surfaces or grooves and ridges shall be completely filled and a completely gas-tight joint be formed.

Fig. 8 shows an embodiment of the invention wherein the joint is enclosed by a separate, U-shaped member 50 which can be compressed to exert the necessary pressure and which performs the function heretofore described in the case of members 14, 15 and 47. Member 50 can be provided with ridges or grooves as illustrated, or if preferred the ridges or grooves may be provided on the element 50, a variation which may also be employed in any of the other embodiments. If both of the contacting surfaces are provided with ridges and grooves, the contacting members may be made of the same or different materials of the same or different hardness because of the interlocking contact which is effected. Said interlocking contact may be further made hermetic by use of cellulose acetate or some other suitable cementitious material that will completely fill all interstices. For example the member 51 may be made of Bakelite and member 52 may be made of sheet metal and the connecting member 50 will properly form a fluid-tight joint with both.

Fig. 9 shows an embodiment of the present invention wherein the member 56 is made integral with one of the elements to be connected. Thus element 57 is provided with a bent edge portion forming a groove into which the other member 58 is introduced and secured therein as heretofore described. In any of the embodiments, a washer of soft material, such as copper, lead, etc. may be placed between the contacting members, whether provided with ridges or grooves or not, so that when said members are pressed together the washer material will be deformed and fill in all gaps or spaces between said members.

It will therefore be apparent from the foregoing disclosure that the present invention provides improved means for connecting a plurality of elements together whether the elements be in angular relationship to each other or whether they be in alinement with each other. In any event, either or both of said members may be provided with the ridges or grooves on the contacting surfaces and whether or not ridges and grooves are provided on either or both of the contacting surfaces, cementitious material or deformable washers may be interposed between the contacting surfaces to more intimately fill all spaces between the surfaces of the elements to be joined and thereby assure a hermetic or gas-tight joint.

It will therefore be perceived that by the present invention an improved heat insulating element has been provided whereby the conduction of heat between the inner and outer walls thereof is materially reduced. The spacing or connecting member of poor heat conductivity not only minimizes the conduction of heat between the inner and outer walls of the heat insulating element, but by the disposition of said member in opposition to the door or lid and by making the opposed portion or wall of said door or lid of poor heat conductivity, the conduction of heat between the heat insulating element and the outside through said door or lid is also reduced to a minimum. Furthermore by means of the provision within the door or lid of the recess for receiving the conduit, conductor or the like to connect elements within and without the heat insulating element such element may be simply and inexpensively constructed of standardized form since provision for the passing of the conduit, conductor or the like through the walls thereof has been completely avoided. Furthermore the present invention provides means whereby walls of material that could not be soldered, welded or brazed may be suitably connected into a gas-tight or hermetic joint and whereby material possessed of poor heat conductivity can be used as spacing or connecting members as heretofore disclosed.

While the embodiments of the present invention illustrated on the drawing have been described with considerable particularity, it is to be expressly understood that the invention is not restricted thereto, as the invention is capable of receiving a variety of mechanical expressions, some of which will now readily suggest themselves to those skilled in the art, while changes may be made in the details of construction, material, arrangement and proportion of parts without departing from the spirit of the invention. Reference is therefore to be had to the appended claims for a definition of said invention.

What is claimed is:

1. Insulating structure including spaced walls, a wall of poor heat conducting properties connecting said spaced walls, said spaced walls having serrated portions and said wall of poor heat conducting properties being engaged on opposite sides by said serrated portions which bite into said wall of poor heat conducting material.

2. Insulating structure including spaced walls, a wall of poor heat conducting properties connecting said spaced walls, and means for hermetically connecting said poor heat conducting wall to said spaced walls including clamp members having serrated gripping surfaces engaging opposite sides of the poor heat conducting wall with the serrations biting into said latter wall.

3. Insulating structure including spaced walls extending transversely to the direction of heat flow and a wall extending in the direction of heat flow, the last mentioned wall being of non-metallic poor heat conducting material, and means for hermetically connecting said wall of poor heat conducting material to said spaced walls including clamping elements having serrated gripping surfaces of relatively hard material engaging on opposite sides of said non-metallic poor heat conducting wall adjacent the edges thereof with the serrations biting into the softer wall.

4. Refrigerator cabinet construction comprising walls defining a refrigerated storage space having a door opening providing access thereto, said walls presenting an edge at the door opening, refrigerating apparatus associated with said cabinet and having a portion in said storage space for refrigerating the same, another portion without said storage space and a connecting portion extending over said edge through said door opening into said storage space and connecting said first-named portions, and a door for closing said door opening and constructed with an indentation for said connecting portion, and compressible means in said indentation for effecting a tight joint around said connecting portion.

5. Refrigerator cabinet construction comprising walls defining a refrigerated storage space having a door opening providing access thereto, said walls presenting an edge at the door opening, refrigerating apparatus associated with said cabinet and having a refrigerating element in said storage space, another element without said storage space and a portion extending over said edge through said door opening into said storage space and connecting said elements, a door for closing said door opening and constructed with a recess for said connecting portion, and heat insulating means in said recess providing a substantially tight joint around said connecting portion when the door is closed.

6. Refrigerating cabinet construction comprising connected walls, one of said walls having poor heat conducting properties and the other of said walls having opposed serrated gripping portions engaging opposite sides and biting into the wall of poor heat conducting properties.

7. Refrigerator cabinet construction comprising insulated walls defining a refrigerated storage space and a door opening affording access thereto, closure means for said door opening, refrigerating apparatus having a portion in said storage space for refrigerating the same, another portion located exteriorly of said storage space, and a connecting portion located in the joint between the closure means and the walls forming the door opening, the cabinet being provided with a recess through the joint to accommodate the connecting portion, and means for sealing the joint around said connecting portion against heat flow.

8. Refrigerator cabinet construction comprising insulated top, bottom, and side walls defining a food storage compartment, said side walls being provided with a door opening affording access to said food storage compartment, closure means for said door opening of a size to completely cover said door opening and when closed to overlap the walls of the cabinet above said door opening on all sides and with no part of said closure means projecting to a considerable extent within said door opening but being disposed outwardly of and leaving the door opening unobstructed affording storage space within the cabinet and within said door opening, the overlap of the closure means on all sides about the door opening providing a relatively wide gap through which heat must flow in entering the cabinet through the door opening around the closure means, and annular sealing means between the closure means and the walls of the cabinet about said door opening for retarding heat flow.

9. Refrigerator cabinet construction comprising insulated top, bottom, and side walls defining a food storage compartment, said walls defining a door opening affording access to said food storage compartment, closure means for said door opening of a size to completely cover said door opening and when closed to overlap the walls of the cabinet about said door opening on all sides and with no part of said closure means projecting to a considerable extent within said door opening but being disposed outwardly of and leaving the door opening unobstructed affording storage space within the cabinet and within said door opening, the overlap of the closure means on all sides about the door opening providing a relatively wide gap through which heat must flow in entering the cabinet through the door opening around the closure means, and annular sealing means between the closure means and the walls of the cabinet about said door opening for retarding heat flow.

10. Refrigerator cabinet construction including an inner insulation bounding member constituting a liner bounding a food storage space and having side, bottom, top and back walls and open at the front to provide an access opening in a vertical plane, an outer insulation bounding member spaced from said inner member and having front edges in substantially a vertical plane, insulation between said members, a breaker strip of low heat conductivity connecting said inner and outer members and disposed in a single vertical plane at right angles to the side, bottom and top walls of the liner member, whereby the breaker strip is flat across the front of the insulated wall structure, a door for closing said access opening of a size to completely cover said access opening and when closed to overlap the breaker strip and cover the entire front area between the inner and outer bounding members and with no part of said door projecting to any considerable extent within said access opening but being disposed outwardly of and leaving the door opening unobstructed affording storage space within the cabinet from the rear all the way forward to the breaker strip plane, the overlap of the closure means on all sides about the access opening providing a relatively wide gap through which heat must flow in entering the storage space through the access opening and adjacent the door, and annular gasketing between the overlapping surface of the door and the front facing portion of the cabinet around the access opening for retarding heat flow.

CARL GEORG MUNTERS.